T. J. BARNES.
Axle Box.

No. 240,640.  Patented April 26, 1881.

Witnesses
Fred G. Dieterich
Albert A. Krause

Inventor
Thomas J. Barnes
by Louis Bagger & Co.
Attorneys

UNITED STATES PATENT OFFICE.

THOMAS J. BARNES, OF AUSTIN, TEXAS.

AXLE-BOX.

SPECIFICATION forming part of Letters Patent No. 240,640, dated April 26, 1881.

Application filed February 28, 1880.

*To all whom it may concern:*

Be it known that I, THOMAS J. BARNES, of Austin, in the county of Travis and State of Texas, have invented certain new and useful Improvements in Self-Oiling Axle-Boxes; and I do hereby declare that the following is a full, clear, and exact description of the invention, which will enable others skilled in the art to which it appertains to make and use the same, reference being had to the accompanying drawings, which form a part of this specification, and in which—

Figure 1:
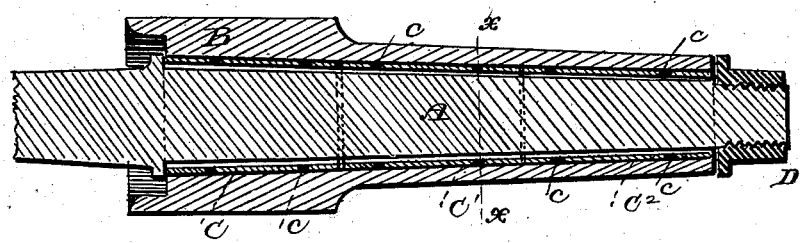
Figure 2:
Figure 3:
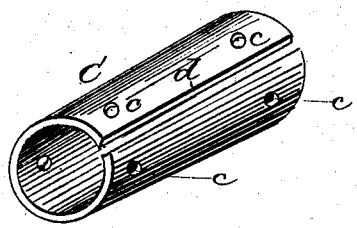
Figure 4:
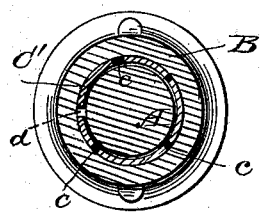

Figure 1 is a longitudinal section of an axle-box provided with my improved oil-box or lubricating attachment. Fig. 2 is a side view of the spindle with its lubricating attachment detached from the axle-box. Fig. 3 is a perspective view of one of the sections of the lubricating attachment, (when this is made in sections,) and Fig. 4 is a transverse section on line $x\ x$ in Fig. 1.

Similar letters of reference indicate corresponding parts in all the figures.

My invention has relation to that class of self-oiling axle-boxes in which a perforated sleeve is inserted upon the spindle, between it and the box, the perforations or apertures in the sleeve being filled with the lubricating material; and it consists in making the said sleeve in two or more sections, each one of which is slotted longitudinally to adapt it to be sprung upon the spindle, substantially as and for the purpose hereinafter more fully set forth, and particularly pointed out in the claim.

In the drawings, A represents an axle-spindle, and B is the axle-box, both of which are of the ordinary construction.

$C\ C'\ C^2$ is a sleeve or thimble, which consists of two or more sections, as shown in the drawings, each of which has a series of apertures, $c\ c\ c$, and a longitudinal slot, $d$, which gives it the requisite "spring" or elasticity to cause it to fit easily upon the spindle.

The oil, tallow, or other lubricant is filled into the holes $c$ and slots $d$ after the sleeve or sleeves $C\ C'\ C^2$ have been inserted upon the spindle, after which the spindle with its sleeve is inserted into the box B, which is prevented from slipping off by the nut D. As the wheel with its box rotates upon the spindle, the sleeve interposed between the two forms an anti-friction medium, which will partly rotate upon and partly with the spindle.

By making the sleeve in several sections, impinging one upon another edgewise, as shown in the drawings, the said several parts or sections $C\ C'\ C^2$ are enabled to rotate independent of each other, thus distributing the lubricant contained within their respective apertures more evenly over the box and spindle, and adjusting themselves to the friction between the two, which may be greater at one point within the box than at another.

Having thus described my invention, I claim and desire to secure by Letters Patent of the United States—

The combination, with the spindle A and box B, of the interposed sectional sleeve $C\ C'\ C^2$, provided with the apertures $c$ and longitudinal slots $d$, substantially as and for the purpose herein shown and specified.

In testimony that I claim the foregoing as my own I have hereto affixed my signature in presence of two witnesses.

THOMAS J. BARNES.

Witnesses:
M. C. MOULTON,
C. R. BEATY.